US012613951B2

(12) United States Patent
Kim

(10) Patent No.: US 12,613,951 B2
(45) Date of Patent: Apr. 28, 2026

(54) METHOD AND DEVICE FOR CONNECTING MAP APPLICATION TO PROCESS FOR AFFILIATION AUTHENTICATION OF USER ACCOUNT

(71) Applicant: KAKAO CORP., Jeju-si (KR)

(72) Inventor: Soo Ji Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 43 days.

(21) Appl. No.: 18/658,647

(22) Filed: May 8, 2024

(65) Prior Publication Data

US 2024/0378278 A1 Nov. 14, 2024

(30) Foreign Application Priority Data

May 10, 2023 (KR) ......................... 10-2023-0060320

(51) Int. Cl.
*H04L 9/32* (2006.01)
*G01C 21/00* (2006.01)
*G06F 21/36* (2013.01)

(52) U.S. Cl.
CPC ......... *G06F 21/36* (2013.01); *G01C 21/3874* (2020.08)

(58) Field of Classification Search
CPC .. G06F 21/36; G06F 3/0484; G06F 16/90332; G06F 16/9537; G06F 16/9538; G06F 21/31; G01C 21/3874; G06Q 10/047; G06Q 30/018; G06Q 30/0282; G06Q 30/0601; G06Q 50/01; G06Q 50/10; H04L 51/046; H04L 63/08; H04W 4/02
See application file for complete search history.

(56) References Cited

U.S. PATENT DOCUMENTS

2016/0063003 A1* 3/2016 Tseng ...................... G06F 16/29
707/724
2016/0343033 A1* 11/2016 DeWitt ............... H04W 12/068

FOREIGN PATENT DOCUMENTS

KR 10-2232056 B1 3/2021

OTHER PUBLICATIONS

Guide to using promotional codes and changing affiliations, https://blog.naver.com/bluefrogco/222669809127, retrieved on Mar. 11, 2022.
Essential app for college students) How to get discounts and save money by joining the group 1, https://blog.naver.com/bvin03/223086877407, retrieved on Apr. 27, 2023.

* cited by examiner

*Primary Examiner* — Hany S. Gadalla
(74) *Attorney, Agent, or Firm* — Seed Intellectual Property Law Group LLP

(57) ABSTRACT

A server providing a service is provided. The server includes a communicator, a memory configured to store computer-executable instructions, and a processor configured to execute the instructions by accessing the memory. The instructions may be configured to cause the server to transmit, to a user terminal, a display command of a graphic representation requesting affiliation authentication from a user based on at least one of search information of the user or location information of the user collected from the user terminal executing a map application and to transmit an offer command of a process for affiliation authentication of a user account to the user terminal in response to a user input for a graphic representation requesting the affiliation authentication.

23 Claims, 9 Drawing Sheets

METHOD AND DEVICE FOR CONNECTING MAP APPLICATION TO PROCESS FOR AFFILIATION AUTHENTICATION OF USER ACCOUNT

CROSS-REFERENCE TO RELATED APPLICATION

This application claims the benefit of Korean Patent Application No. 10-2023-0060320 filed on May 10, 2023, in the Korean Intellectual Property Office, the entire disclosure of which is incorporated herein by reference for all purposes.

BACKGROUND

Technical Field

One or more embodiments relate to a method of connecting a map application to a process for affiliation authentication of a user account.

Description of the Related Art

Recently, with the development of mobile smart devices, use of an online platform service to communicate with other users via a network has increased. The online platform service for interaction with other users may include, as representative examples, a social networking service (SNS), which is an online platform for generating and consolidating social relationships through communication among users, information sharing, and expansion of personal connections, and an instant messaging service (IMS), which is an online platform for real-time content communication between two or more users.

BRIEF SUMMARY

According to an embodiment, there is provided a method performed by a server including transmitting, to a user terminal, a display command of a graphic representation requesting affiliation authentication from a user based on at least one of search information of the user or location information of the user collected from the user terminal executing a map application, and transmitting an offer command of a process for affiliation authentication of a user account to the user terminal in response to a user input for the graphic representation requesting the affiliation authentication.

The search information of the user may include at least one of a search term searched with in the map application, a searched place, or a focused target area in the map application.

The transmitting of the display command of the graphic representation requesting the affiliation authentication may include determining a reference location of the user based on at least one of the search information of the user or the location information of the user.

The transmitting of the display command of the graphic representation requesting the affiliation authentication may include transmitting the display command of the graphic representation requesting the affiliation authentication to the user terminal in response to the determined reference location of the user being included in an area corresponding to the affiliation authentication.

The transmitting of the display command of the graphic representation requesting the affiliation authentication may include transmitting, to the user terminal, a display command of a graphic representation requesting affiliation authentication comprising at least one of student authentication, completion authentication, graduate authentication, or faculty authentication of a school.

The method may further include transmitting, to the user terminal, a display command of a graphic representation for search of a benefit place that offers a benefit to an affiliation-authenticated user account, based on at least one of the search information of the user or the location information of the user. The method may further include transmitting a display command of a list of benefit places to the user terminal in response to detecting a user input for the graphic representation for the search of the benefit place.

The method may further include, in response to entering a keyword related to a benefit offered to an affiliation-authenticated user account, transmitting a display command of a list of benefit places related to the keyword to the user terminal.

The method may further include, in response to receiving from the user terminal an inquiry request requesting an inquiry about a target place and in response to the target place corresponding to a benefit place that offers a benefit to an affiliation-authenticated user account, transmitting, to the user terminal, a display command of a graphic representation indicating offering of the benefit.

The method may further include, in response to the user account being affiliation-authenticated, transmitting, to the user terminal, a display command of a guidance message comprising change information on a benefit place included in an area corresponding to an affiliation of the user account based on a change in the benefit place.

The transmitting of the display command of the graphic representation requesting the affiliation authentication may include, in response to the user account being affiliation-authenticated, restricting transmission of the display command of the graphic representation requesting the affiliation authentication to the user terminal.

The transmitting of the display command of the graphic representation requesting the affiliation authentication may include determining an authentication type based on at least one of the search information of the user or the location information of the user. The transmitting of the display command of the graphic representation requesting the affiliation authentication may include transmitting a display command of a graphic representation requesting affiliation authentication of the determined authentication type to the user terminal.

The transmitting of the display command of the graphic representation requesting the affiliation authentication may include determining an affiliation of the user based on at least one of the search information of the user or the location information of the user. The transmitting of the display command of the graphic representation requesting the affiliation authentication may include transmitting a display command of a graphic representation requesting affiliation authentication of the determined affiliation to the user terminal.

According to an embodiment, there is provided a method performed by a user terminal including displaying a graphic representation requesting affiliation authentication from a user based on at least one of search information of the user or location information of the user collected while executing a map application, and providing a process for affiliation authentication of a user account to the user in response to detecting a user input for the graphic representation requesting the affiliation authentication.

3                                                                    4

The search information of the user may include at least one of a search term searched with in the map application, a searched place, or a focused target area in the map application.

The displaying of the graphic representation requesting the affiliation authentication may include displaying the graphic representation requesting the affiliation authentication in response to a reference location of the user being included in an area corresponding to the affiliation authentication, wherein the reference location is determined based on at least one of the search information of the user or the location information of the user.

The displaying of the graphic representation requesting the affiliation authentication may include displaying a graphic representation for affiliation authentication including at least one of student authentication, completion authentication, graduate authentication, or faculty certification.

The method may further include displaying a graphic representation for search of a benefit place that offers a benefit to an affiliation-authenticated user account, based on at least one of the search information of the user or the location information of the user. The method may further include displaying a list of benefit places in response to detecting a user input for the graphic representation for the search of the benefit place.

The method may further include, in response to entering a keyword related to a benefit offered to an affiliation-authenticated user account, displaying a list of benefit places related to the keyword.

The method may include, in response to obtaining an inquiry request requesting an inquiry about a target place that is a benefit place offering a benefit to an authenticated affiliated user account, displaying a graphic representation indicating offering of the benefit.

The method may further include, in response to the user account being affiliation-authenticated, displaying a guidance message informing of a change in a benefit place included in an area corresponding to an affiliation of the user account based on a change in the benefit place.

The providing of the process for affiliation authentication of the user account may include restricting display of the graphic representation requesting affiliation authentication in response to the user account being affiliation-authenticated.

The displaying of the graphic representation requesting the affiliation authentication may include displaying a graphic representation requesting affiliation authentication for an affiliation determined based on at least one of the search information of the user or the location information of the user.

According to an embodiment, there is provided a server including a processor configured to transmit, to a user terminal, a display command of a graphic representation requesting affiliation authentication from a user based on at least one of search information of the user or location information of the user collected from the user terminal executing a map application, and transmit an offer command of a process for affiliation authentication of a user account to the user terminal in response to a user input for a graphic representation requesting the affiliation authentication.

According to an embodiment, there is provided a server providing a service, including a communicator, a memory configured to store computer-executable instructions, and a processor configured to execute the instructions by accessing the memory. The instructions may be configured to, when executed by the processor, cause the server to transmit, to a user terminal, a display command of a graphic representation requesting affiliation authentication from a user based on at least one of search information of the user or location information of the user collected from the user terminal executing a map application, and transmit an offer command of a process for affiliation authentication of a user account to the user terminal in response to a user input for a graphic representation requesting the affiliation authentication.

According to an embodiment, there is provided a user terminal including a communicator, a memory configured to store computer-executable instructions, and a processor configured to execute the instructions by accessing the memory. The instructions may be configured to, when executed by the processor, cause the user terminal to display a graphic representation requesting affiliation authentication from a user based on at least one of search information of the user or location information of the user collected from the user terminal executing a map application, and provide a process for affiliation authentication of a user account to the user in response to detecting a user input for the graphic representation requesting the affiliation authentication.

Additional aspects of embodiments will be set forth in part in the description which follows and, in part, will be apparent from the description, or may be learned by practice of the disclosure.

BRIEF DESCRIPTION OF THE SEVERAL VIEWS OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Figure 1:
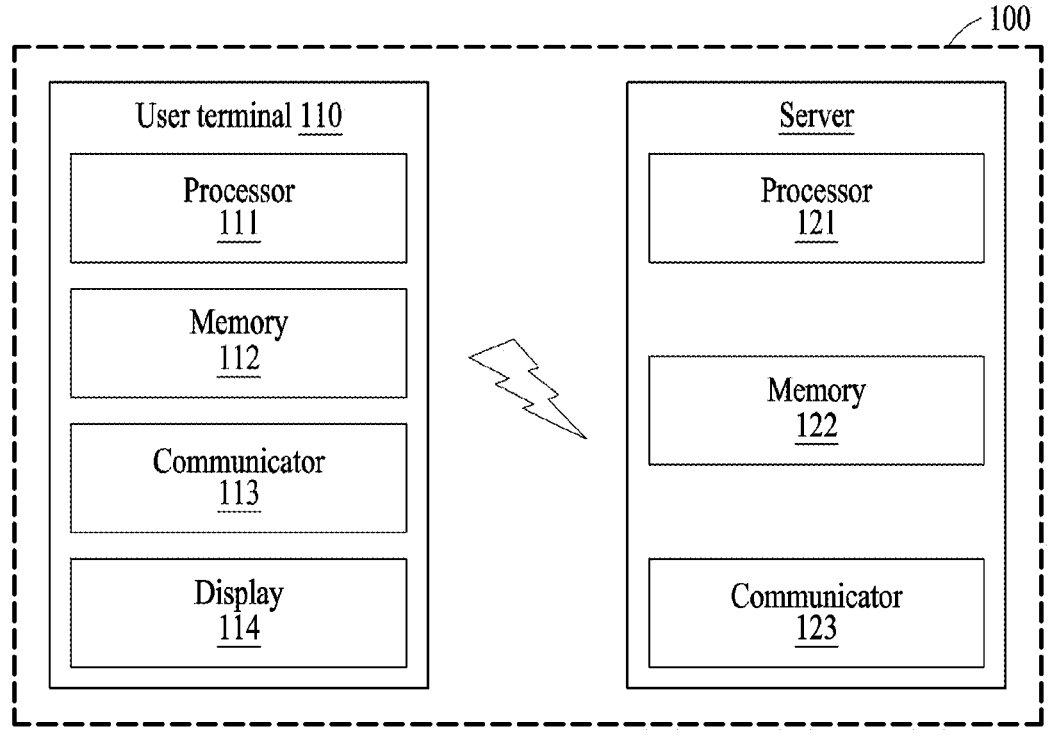
FIG. 1 is a diagram illustrating an affiliation authentication system according to an embodiment.

The following structural or functional description of examples is provided as an example only and various alterations and modifications may be made to the examples. Thus, an actual form of implementation is not construed as limited to the examples described herein and should be understood to include all changes, equivalents, and replacements within the idea and the technical scope of the disclosure.

Although terms such as first, second, and the like are used to describe various components, the components are not limited to the terms. These terms should be used only to distinguish one component from another component. For example, a "first" component may be referred to as a "second" component, and similarly, the "second" component may also be referred to as the "first" component.

It should be noted that when one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical and scientific terms have the same meanings as those commonly understood by one of ordinary skill in the art to which this disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the examples with reference to the accompanying drawings, like reference numerals refer to like components and a repeated description related thereto is omitted.

FIG. 1 is a diagram illustrating an affiliation authentication system according to an embodiment.

An affiliation authentication system 100 according to an embodiment may include a user terminal 110 and a server 120.

The user terminal 110 may refer to one of electronic devices, such as a computer, a portable computer, a wireless phone, a mobile phone, a smartphone, a personal digital assistant (PDA), a web tablet, and any device that includes a display and that may install and execute a service application related to the server 120. Here, the user terminal 110 may perform overall service operations such as service screen configuration, data input, data transmission and reception, and data storage under the control of the application. For example, the user terminal 110 may access the server 120 through the application. For example, the user terminal 110 may proceed with a process for affiliation authentication with the server 120 that provides an affiliation authentication service, and may use a map service and/or an instant messaging service (IMS) provided by the server 120.

The server 120 may provide a service to the user terminal 110. For example, the server 120 may provide an IMS or a social networking service (SNS). The server 120 may provide a map service. The server 120 may provide an affiliation authentication service. According to an embodiment, the server 120 may include an instant messaging server (not shown), an affiliation authentication server (not shown), and a map server (not shown). According to an embodiment, the instant messaging server, the affiliation authentication server, and the map server may be separate servers from the server 120 and may interoperate with the server 120 to provide a corresponding service. The instant messaging server may provide an IMS to the user terminal 110. The affiliation authentication server may provide an affiliation authentication service to the user terminal 110. The map server may provide a map service (e.g., providing a map image and searching for a place) to the user terminal 110.

A user account is created when a user signs up for a service provided by the server 120, and the server 120 may serve as a service platform that provides a service to a user account registered for a service such as an SNS, an IMS, and the like. A user account described herein mainly refers to an account registered for an IMS. Since the user terminal 110 may use a service using a user account, a user account included in the following embodiments may be construed as referring to the user terminal 110.

Affiliation authentication may refer to authentication of an affiliation of a user. The affiliation of the user may include at least one of a school or a company. For example, when the user is a student, a graduate, or a faculty member of school A, the user may have an affiliation with the school A. For example, when the user is an employee of company B, the user may have an affiliation with the company B. The affiliation of the user is mainly described herein as at least one of a school or a company, but the present disclosure is not limited thereto, and the affiliation of the user may include a group corresponding to a plurality of users. For example, the affiliation of the user may include an affiliation based on at least one of a religion, a region, a service provider that provides a product and/or a service the user uses, a subscription service to which the user subscribes, or an influencer that the user follows.

According to an embodiment, the user terminal 110 may include a processor 111, a memory 112, a communicator 113, and a display 114.

The processor 111 may collect at least one of search information of the user or location information of the user while a map application is being executed. The processor 111 may display a graphic representation requesting affiliation authentication from the user based on at least one of the search information of the user or the location information of the user. The processor 111 may provide a process for affiliation authentication of a user account. The processor 111 may temporarily or permanently store, in the memory 112, data required for displaying the graphic representation requesting affiliation authentication and offering a process for the affiliation authentication.

The memory 112 may store information on at least one of the search information of the user, the location information of the user, a graphic representation requesting affiliation authentication, or the process for the affiliation authentication. The memory 112 may store instructions for displaying a graphic representation requesting affiliation authentication and/or offering the process for the affiliation authentication.

The communicator 113 may transmit at least one of the search information of the user, the location information of the user, a display command of a graphic representation, or an offer command of the process for the affiliation authentication. The communicator 113 may establish a wired communication channel and/or a wireless communication channel with an external device (e.g., another electronic device and a server), and may establish communication, for example, via cellular communication, short-range wireless communication, local area network (LAN) communication, Bluetooth™, wireless-fidelity (Wi-Fi) direct, or infrared data association (IrDA), or via a long-range communication network such as a legacy cellular network, a fourth generation (4G) and/or fifth generation (5G) network, next-generation communication, the Internet, or a computer network (e.g., a LAN or a wide area network (WAN)).

The display 114 may visualize at least one of a map image of an area corresponding to the search information of the user and/or the location information of the user, the graphic representation requesting affiliation authentication, a screen related to the process for the affiliation authentication, a graphic representation for a search for a benefit offer, a benefit place list, a graphic representation indicating offering of the benefit, or a guidance message including change information on a benefit place. The display 114 may be, for example, a touch display in which a touch sensing module and a display module are integrally implemented.

According to an embodiment, the server 120 may include a processor 121, a memory 122, and a communicator 123.

The processor 121 may transmit a display command of the graphic representation requesting affiliation authentication to the user terminal 110 based on at least one of the search information of the user or the location information of the user. The processor 121 may transmit an offer command of the process for the affiliation authentication to the user terminal 110. The processor 121 may temporarily or permanently store, in the memory 122, data required to receive the display command of the graphic representation requesting the affiliation authentication and/or perform the offer command of the process for the affiliation authentication.

The memory 122 may store information related to map data including a map image, the display command of the graphic representation, and/or the offer command of the process for the affiliation authentication. The memory 122 may store instructions for transmitting the map data including the map image, transmitting the display command of the graphic representation, and/or transmitting the offer command of the process for the affiliation authentication.

The communicator 123 may transmit at least one of the display command of the graphic representation or the offer command of the process for the affiliation authentication. The communicator 123 may establish a wired communication channel and/or a wireless communication channel with an external device (e.g., an electronic device and another server), and may establish communication, for example, via cellular communication, short-range wireless communication, LAN communication, Bluetooth™, Wi-Fi direct, or IrDA, or via a long-range communication network such as a legacy cellular network, a 4G and/or 5G network, next-generation communication, the Internet, or a computer network (e.g., a LAN or a WAN).

Figure 2:
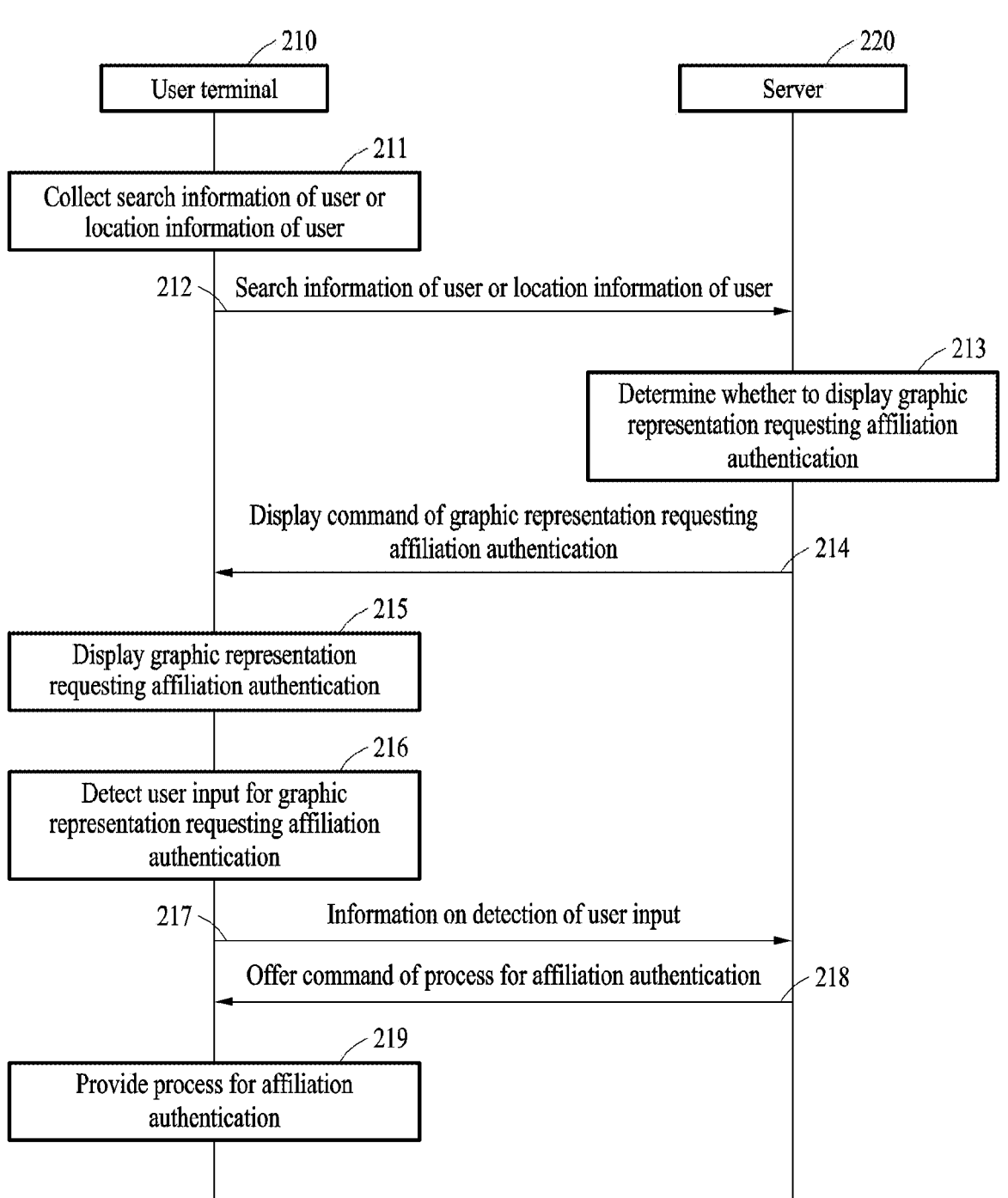
FIG. 2 is a diagram illustrating a method of connecting a map application to an affiliation authentication process, according to an embodiment.

FIG. 2 is a diagram illustrating a method of connecting a map application to an affiliation authentication process, according to an embodiment.

An affiliation authentication system according to an embodiment may include a user terminal 210 (e.g., the user terminal 110 of FIG. 1) and a server 220 (e.g., the server 120 of FIG. 1).

In operation 211, the user terminal 210 may collect at least one of search information of the user or location information of the user while executing a map application.

The search information of the user may include at least one of a search term searched with in the map application, a searched place, or a focused target area in the map application. The user terminal 210 may output a graphic representation of a map corresponding to the target area while executing the map application. The user terminal 210 may change the target area based on a user input detected for the graphic representation of the map and may output a graphic representation of the map corresponding to the changed target area. The focused target area may refer to an area in the map to which the graphic representation output on the display of the user terminal 210 corresponds.

The location information of the user may include information on a geographic location of the user terminal 210. For example, the location information of the user may include GPS information of the user terminal 210.

In operation 212, the user terminal 210 may transmit at least one of the search information of the user or the location information of the user to the server 220. The server 220 may receive at least one of the search information of the user or the location information of the user from the user terminal 210.

In operation 213, the server 220 may determine whether to display a graphic representation requesting affiliation authentication. For example, the server 220 may determine a reference location of a user based on at least one of the search information of the user or the location information of the user. The server 220 may determine to display the graphic representation requesting affiliation authentication in response to the determined reference location of the user being included in an area corresponding to the affiliation authentication.

According to an embodiment, the reference location may be determined based on the search information of the user. For example, when a search term in the map application includes a keyword related to an affiliation (e.g., a school name, a school building name, a company name, and a company building name), the server 220 may determine a location corresponding to the keyword to be the reference location of the user. For example, the server 220 may determine a location (e.g., a central location of the target area) corresponding to the focused target area to be the reference location. For example, the server 220 may determine a location of a place searched for on the map application to be the reference location.

According to an embodiment, the reference location may be determined based on the location information of the user. For example, the server 220 may determine a location corresponding to the location information of the user (e.g., GPS information) to be the reference location.

The determining of whether to display the graphic representation requesting affiliation authentication by the server 220 is mainly described herein, but embodiments are not limited thereto. For example, the user terminal 210 may determine whether to display the graphic representation requesting affiliation authentication based on the collected search information or the location information of the user.

In operation 214, in response to determining to display the graphic representation requesting affiliation authentication, the server 220 may transmit a display command of the graphic representation requesting affiliation authentication to the user terminal 210. The user terminal 210 may receive the display command of the graphic representation requesting affiliation authentication from the server 220. In various embodiments of the present disclosure, a command (e.g., the display command and an offer command) transmitted and received between the server 220 and the user terminal 210 may include a signal for one of the server 220 and the user terminal 210 to trigger an operation of the other. For example, a display command transmitted from the server 220 to the user terminal 210 may include information for the user terminal 210 to display an object (e.g., the graphic representation requesting the affiliation authentication)

specified by the display command and/or a signal to cause the user terminal 210 to display the specified object.

In operation 215, the user terminal 210 may display the graphic representation requesting the affiliation authentication.

In operation 216, the user terminal 210 may detect a user input for the graphic representation requesting the affiliation authentication.

In operation 217, the user terminal 210 may transmit information on a detection of the user input for the graphic representation requesting the affiliation authentication to the server 220. The server 220 may receive the information on a detection of the user input for the graphic representation requesting the affiliation authentication from the user terminal 210.

In operation 218, in response to the user input for the graphic representation requesting the affiliation authentication, the server 220 may transmit the offer command of a process for the affiliation authentication to the user terminal 210. The user terminal 210 may receive the offer command of the process for the affiliation authentication from the server 220. The offer command of the process transmitted from the server 220 to the user terminal 210 may include the information for the user terminal 210 to offer a process (e.g., the graphic representation requesting the affiliation authentication) specified by the display command and/or a signal to cause the user terminal 210 to offer the specified process to the user.

In operation 219, the user terminal 210 may provide the process for the affiliation authentication. For example, the user terminal 210 may provide the process for the affiliation authentication by connecting the map application to another application (e.g., an instant messaging application) that provides an affiliation authentication service. However, the present disclosure is not limited to providing the process for the affiliation authentication through another application, and the process for the affiliation authentication may also be provided through a map application.

Figure 3:
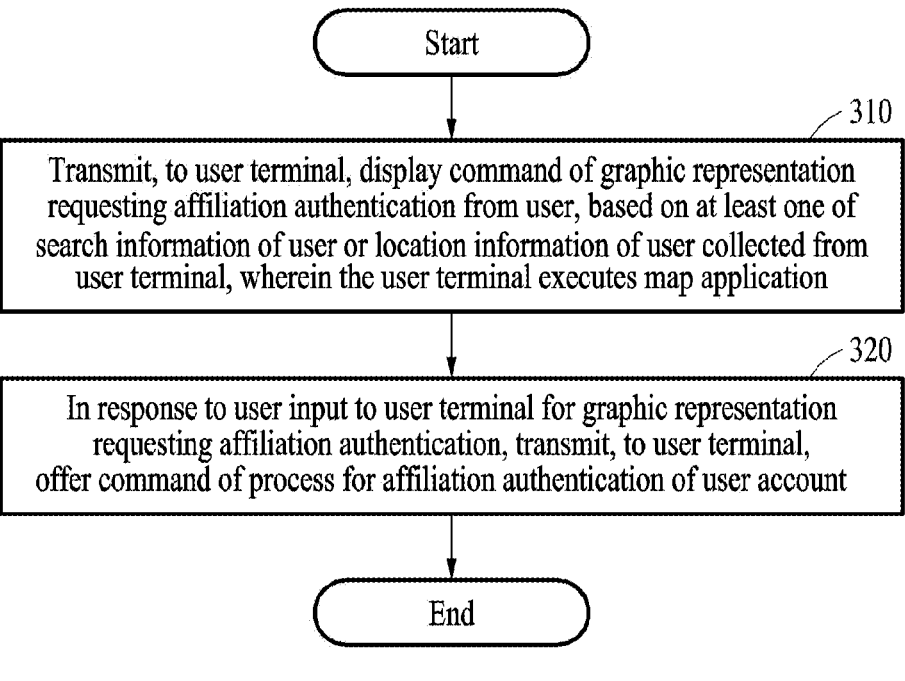
FIG. 3 is a diagram illustrating a method of providing a process for affiliation authentication, the method being performed by a server, according to an embodiment.

FIG. 3 is a diagram illustrating a method of providing a process for affiliation authentication, the method being performed by a server, according to an embodiment.

A method of providing a process for affiliation authentication, performed by a server (e.g., the server 120 of FIG. 1 and the server 220 of FIG. 2), according to an embodiment, may include operation 310 of transmitting a display command of a graphic representation requesting affiliation authentication and operation 320 of transmitting an offer command of a process for affiliation authentication.

In operation 310, the server may transmit a display command of a graphic representation requesting affiliation authentication from a user to a user terminal, based on at least one of search information of the user or location information of the user collected from the user terminal, which executes a map application. According to an embodiment, the server may use the search information of the user and/or the location information of the user that have been collected from the user terminal or the search information and/or location information of the user collected in real time.

Affiliation authentication may refer to authentication of an affiliation of a user corresponding to a user account, and may include, for example, at least one of school authentication or company authentication. The school authentication may include at least one of student authentication to authenticate the user corresponding to the user account as an enrolled student of the school, completion authentication to authenticate the user as a person who has completed a course at the school, graduate authentication to authenticate the user as a graduate of the school, or faculty authentication to authenticate the user as a faculty member of the school. In a case of a university, a student may include a university student and a graduate school student. The school authentication is not limited to at least one of the student authentication, completion authentication, graduate authentication, or faculty authentication stated above, and may include authentication (e.g., researcher authentication and an instructor authentication) for a user who belongs to an organization (e.g., an industry-academia cooperation group and a business group) related to the school. The company authentication may include employee authentication to authenticate the user corresponding to the user account as an employee of the company.

According to an embodiment, the server may transmit the display command of the graphic representation requesting affiliation authentication to the user terminal, based on search information including at least one of a search term searched with in the map application, a searched place, or a focused target area in the map application.

For example, the server may transmit the display command of the graphic representation requesting the affiliation authentication to the user terminal based on a keyword included in a search term entered in the map application. For example, when the search term includes a keyword corresponding to a school, the server may transmit a display command of a graphic representation requesting school authentication to the user terminal. A keyword corresponding to a school may include at least one of a school name, a name of a school event (e.g., a festival, a sports day, and a fair), a name of a school landmark (e.g., a building, a square, and a facility), or a keyword (e.g., a midterm exam, a final exam, an exam period, an opening party, an end-of-semester party, a club dinner, a freshman learning place (or a freshman place), and an orientation (OT)) related to school life. For example, when the search term includes a keyword corresponding to a company, the server may transmit a display command of a graphic representation requesting employee authentication of the company to the user terminal. A keyword corresponding to a company may include at least one of a company name, a post name, a position name, a job name, a department name, a name of a company landmark (e.g., a building, a square, and a facility), or a keyword (e.g., a company dinner, overtime, a commute to work, leaving work, and a payday) related to company life. A keyword of the present disclosure is not limited to the keywords corresponding to a school and/or the keywords corresponding to a company described above, and may include keywords related to affiliation authentication.

For example, the server may transmit the display command of the graphic representation requesting the affiliation authentication to the user terminal based on at least one of a searched place or a focused target area. For example, in response to a searched place corresponding to a place related to affiliation authentication, the server may transmit the display command of the graphic representation requesting the affiliation authentication to the user terminal. For example, in response to a number of places related to affiliation authentication included in a focused target area exceeding a threshold number, the server may transmit the display command of the graphic representation requesting the affiliation authentication to the user terminal. A place related to affiliation authentication may include a place for which a number of searches by an affiliation-authenticated user account exceeds a threshold number, a place that offers a benefit to the affiliation-authenticated user account, or a place located in an area corresponding to the affiliation authentication. The area corresponding to the affiliation authentication may include an area in which a user, who searches or is located in a corresponding area and/or a place included in the corresponding area, is expected to perform affiliation authentication related to the corresponding area. For example, the area corresponding to the affiliation authentication may include at least one of a geographical area of the affiliation, a surrounding area of the affiliation, or a living area of affiliated users. For example, the area corresponding to the affiliation authentication may include at least one of an inside of a school campus, a university area, an inside of business premises of a company, or a shuttle bus stop of a company.

According to an embodiment, the server may determine a reference location of the user based on at least one of the search information of the user or the location information of the user. For example, the server may determine at least one of a location corresponding to a keyword related to affiliation included in a search term searched with in the map application, a location corresponding to a searched place, a location corresponding to a focused target area, or a location corresponding to the location information of the user, which are in the map application, to be the reference location of the user. In response to the determined reference location of the user being included in the area corresponding to the affiliation authentication, the server may transmit the display command of the graphic representation requesting the affiliation authentication to the user terminal.

According to an embodiment, the server may provide affiliation authentication of a plurality of authentication types (e.g., school authentication and company authentication). The server may determine an authentication type based on at least one of the search information of the user or the location information of the user. The server may transmit a display command of a graphic representation requesting affiliation authentication of the determined authentication type to the user terminal.

For example, the server may transmit a display command of a graphic representation requesting affiliation authentication of an authentication type corresponding to a keyword detected from a search term to the user terminal. For example, when the server detects a keyword (e.g., a midterm exam) corresponding to school authentication from the search term, the server may transmit the display command of the graphic representation requesting the school authentication to the user terminal. When detecting a keyword (e.g., a commute to work) corresponding to company authentication from the search term, the server may transmit a display command of a graphic representation requesting company authentication to the user terminal.

For example, the server may transmit a display command of a graphic representation requesting affiliation authentication of an authentication type that offers a benefit in the searched place to the user terminal. For example, when the searched place provides a benefit to a school-authenticated user account, the server may transmit the display command of the graphic representation requesting the school authentication to the user terminal. When the searched place provides a benefit to a company-authenticated user account, the server may transmit the display command of the graphic representation requesting the company authentication to the user terminal.

For example, the server may transmit, to the user terminal, a display command of a graphic representation requesting affiliation authentication of an authentication type mapped to an area including the reference location of the user. For example, when the reference location of the user is included in an area corresponding to the school authentication, the server may transmit the display command of the graphic representation requesting the school authentication to the user terminal. When the reference location of the user is included in an area corresponding to the company authentication, the server may transmit the display command of the graphic representation requesting the company authentication to the user terminal.

According to an embodiment, the server may determine an affiliation of the user based on at least one of the search information of the user or the location information of the user. The server may transmit a display command of a graphic representation requesting affiliation authentication of the determined affiliation to the user terminal. For example, a plurality of affiliations (e.g., the school A, school B, and company C) may respectively correspond to a plurality of areas. When the reference location of the user is included in an area corresponding to the school A, the server may determine an affiliation of the user to be the school A and transmit a display command of a graphic representation requesting affiliation authentication for the school A to the user terminal.

According to an embodiment, in response to the user account being affiliation-authenticated, the server may restrict transmission of the display command of the graphic representation requesting the affiliation authentication to the user terminal. The server may prevent deterioration of user experience due to displaying an unnecessary graphic representation to an already affiliation-authenticated user account by restricting the transmission of the display command of the graphic representation requesting the affiliation authentication when the user account is already affiliation-authenticated.

For example, when a plurality of authentication types (e.g., school authentication and company authentication) of affiliation authentication is provided, the server may restrict transmission of a display command of a graphic representation for affiliation authentication of an authentication type (e.g., company authentication) that has already been affiliation-authenticated to the user terminal and may transmit a display command of a graphic representation for affiliation authentication of an authentication type (e.g., school authentication) that has not been affiliation-authenticated to the user terminal.

An example of the graphic representation requesting the affiliation authentication is described below with reference to FIGS. 5 and 6.

In operation 320, in response to a user input for the graphic representation requesting affiliation authentication, the server may transmit an offer command of a process for affiliation authentication of the user account to the user terminal. For example, the server may command the user terminal to display a screen according to the process for the affiliation authentication of the user account.

Although not explicitly shown in FIG. 3, according to an embodiment, the server may transmit a display command of information on a benefit place that provides a benefit to an authenticated affiliated user account to the user terminal. The display command of the information on the benefit place is described below with reference to FIGS. 5 to 9.

Figure 4:
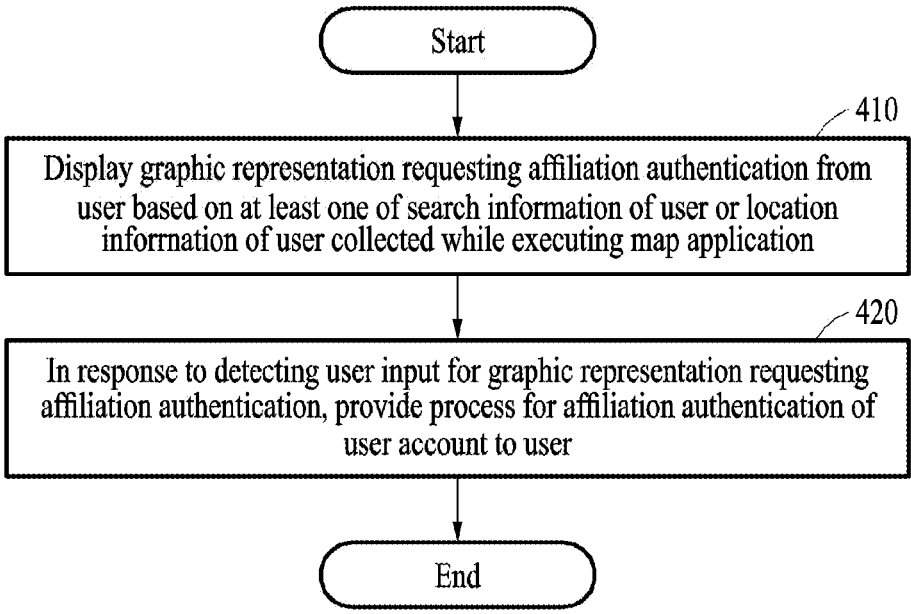
FIG. 4 is a diagram illustrating a method of providing a process for affiliation authentication, the method being performed by a user terminal, according to an embodiment.

FIG. 4 is a diagram illustrating a method of providing a process for affiliation authentication, the method being performed by a user terminal, according to an embodiment.

A method of providing a process for affiliation authentication, performed by a user terminal (e.g., the user terminal 110 of FIG. 1 and the user terminal 210 of FIG. 2), according to an embodiment, may include operation 410 of displaying a graphic representation requesting affiliation authentication and operation 420 of providing a process for affiliation authentication to a user.

In operation 410, the user terminal may display a graphic representation requesting affiliation authentication from the user based on at least one of search information of the user or location information of the user collected while executing a map application. As described above with reference to FIG. 3, the affiliation authentication may refer to affiliation authentication of a user corresponding to a user account and may include, for example, at least one of school authentication or company authentication.

According to an embodiment, the user terminal may display the graphic representation requesting the affiliation authentication based on search information including at least one of a search term searched with in a map application, a searched place, or a focused target area in the map application.

For example, the user terminal may display the graphic representation requesting the affiliation authentication based on a keyword included in the search term entered in the map application. For example, when the search term includes a keyword corresponding to a school, the user terminal may display a graphic representation requesting the school authentication. For example, when the search term includes a keyword corresponding to a company, the user terminal may display a graphic representation requesting employee authentication of the company.

For example, the user terminal may display the graphic representation requesting the affiliation authentication based on at least one of a searched place or a focused target area. For example, in response to a searched place corresponding to a place related to affiliation authentication, the user terminal may display the graphic representation requesting the affiliation authentication. For example, in response to a number of places related to affiliation authentication included in the focused target area exceeding a threshold number, the user terminal may display the graphic representation requesting the affiliation authentication.

According to an embodiment, the user terminal may display the graphic representation requesting the affiliation authentication in response to the reference location of the user, which is determined based on at least one of the search information of the user or the location information of the user, being included in an area corresponding to affiliation authentication. For example, the user terminal (or a server) may determine at least one of a location corresponding to a keyword related to affiliation included in a search term searched with in the map application, a location corresponding to a searched place, a location corresponding to a focused target area, or a location corresponding to the location information of the user, which are in the map application, to be the reference location of the user. The user terminal may display a graphic representation requesting affiliation authentication in response to the determined reference location of the user being included in an area corresponding to the affiliation authentication.

According to an embodiment, the user terminal may provide affiliation authentication of a plurality of authentication types (e.g., school authentication and company authentication). The user terminal (or the server) may determine an authentication type based on at least one of the search information of the user or the location information of the user. The user terminal may display a graphic representation requesting affiliation authentication of the determined authentication type.

For example, the user terminal may display a graphic representation requesting affiliation authentication of an authentication type corresponding to a keyword detected from a search term.

For example, a place searched in a map application may offer a benefit to a user account that has performed affiliation authentication of at least one authentication type among the plurality of authentication types. The user terminal may display a graphic representation requesting affiliation authentication of an authentication type for which the searched place provides a benefit, among the plurality of authentication types. For example, when a place that offers a benefit to a school-authenticated user account is searched for, the user terminal may display a graphic representation requesting the school authentication.

For example, an area may be mapped to at least one authentication type among the plurality of authentication types. For example, a campus area of A university may correspond to the school authentication, and a business premises area of company B may correspond to the company authentication. The user terminal may display a graphic representation requesting affiliation authentication of an authentication type mapped to an area including the reference location of the user. For example, when the reference location of the user is included in the campus area of the A university, the user terminal may display a graphic representation requesting affiliation authentication of the school authentication. For example, when the reference location of the user is included in the business premises area of the company B, the user terminal may display a graphic representation requesting affiliation authentication of the company authentication.

According to an embodiment, the user terminal may display a graphic representation requesting affiliation authentication of an affiliation of the user determined based on at least one of the search information of the user or the location information of the user. The user terminal (or the server) may determine the affiliation of the user based on at least one of the search information of the user or the location information of the user. The user terminal may display a graphic representation requesting the affiliation authentication of the determined affiliation.

According to an embodiment, the user terminal may restrict display of the graphic representation requesting the affiliation authentication in response to the user account being affiliation-authenticated. The user terminal may prevent deterioration of user experience due to displaying an unnecessary graphic representation to an already affiliation-authenticated user account by restricting the display of the graphic representation requesting the affiliation authentication when the user account is already affiliation-authenticated.

For example, when a plurality of authentication types (e.g., school authentication and company authentication) of affiliation authentication is provided, the user terminal may restrict display of a graphic representation for affiliation authentication of an authentication type (e.g., company authentication) that has already been affiliation-authenticated and may display a graphic representation for affiliation authentication of an authentication type (e.g., school authentication) that has not been affiliation-authenticated.

An example of the graphic representation requesting the affiliation authentication is described below with reference to FIGS. 5 and 6.

In operation 420, in response to detecting a user input for the graphic representation requesting the affiliation authentication, the user terminal may provide a process for affiliation authentication of the user account to the user. For example, the user terminal may display a screen according to the process for the affiliation authentication of the user account.

Although not explicitly shown in FIG. 4, according to an embodiment, the user terminal may display information on a benefit place that offers a benefit to an authenticated affiliated user account. The display of information on the benefit place is described below with reference to FIGS. 5 to 9.

Figure 5:
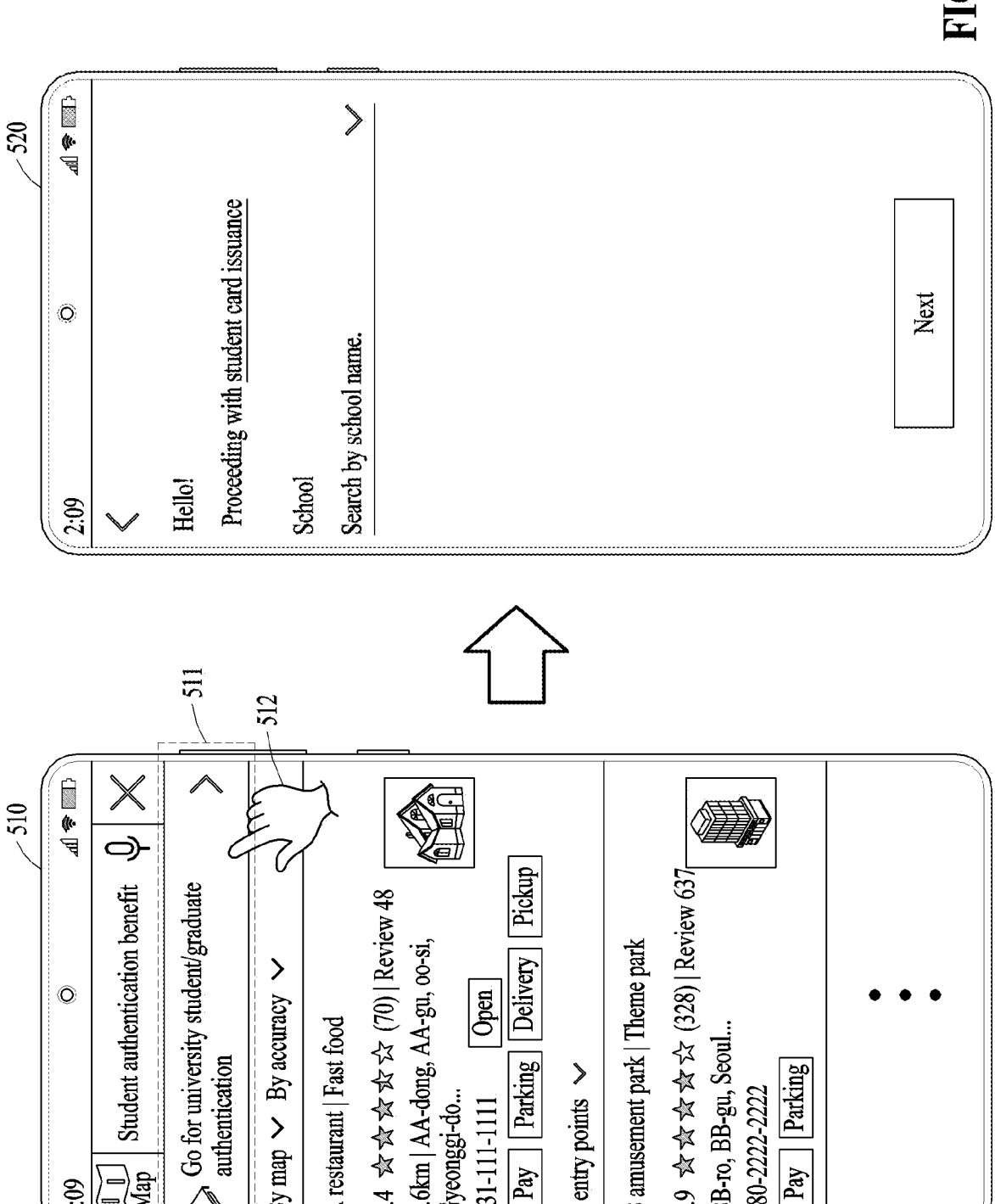
FIG. 5 is a diagram illustrating an example of a graphic representation for affiliation authentication, according to an embodiment.

FIG. 5 is a diagram illustrating an example of a graphic representation for affiliation authentication, according to an embodiment.

A screen 510 and a screen 520 may be examples of a screen displayed on a display of a user terminal (e.g., the user terminal 110 of FIG. 1 and the user terminal 210 of FIG. 2).

In the screen 510, the user terminal may display a result of a search service provided by a map application. The user terminal may display a graphic representation 511 requesting affiliation authentication based on a search term including a keyword related to affiliation. As shown in FIG. 5, when the search term (e.g., student authentication benefit) includes a keyword related to affiliation (e.g., student authentication), the user terminal may display the graphic representation 511 requesting student authentication.

The user terminal may provide a process for affiliation authentication in the screen 520 based on a user input 512 for the graphic representation 511 being detected. For example, the user terminal may display the screen 520 according to the process for the affiliation authentication based on the user input 512 for the graphic representation 511 being detected.

Figure 6:
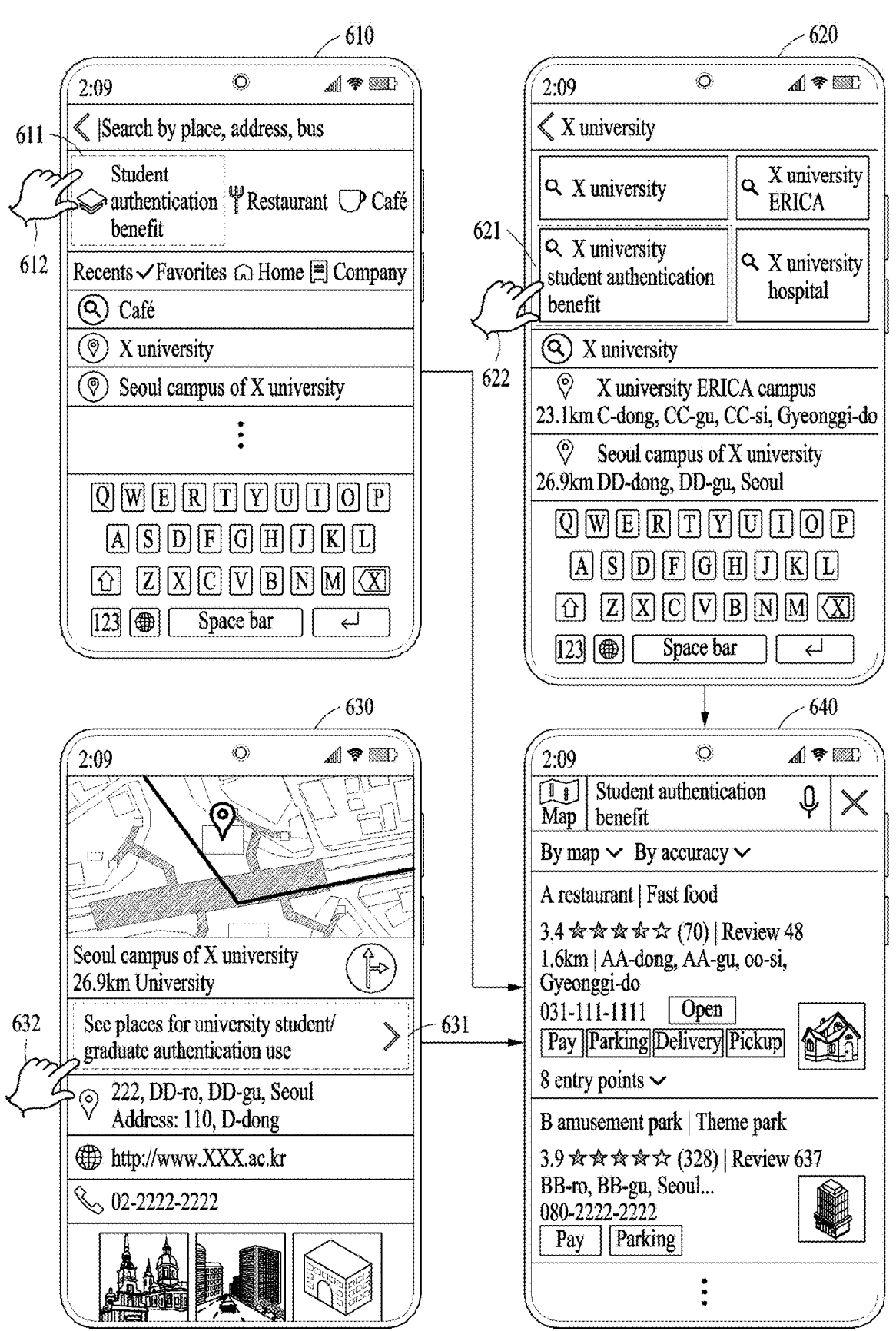
FIG. 6 is a diagram illustrating an example of a screen for displaying information on a benefit place, according to an embodiment.

FIG. 6 is a diagram illustrating an example of a screen for displaying information on a benefit place, according to an embodiment.

According to an embodiment, an affiliation authentication system (e.g., the affiliation authentication system 100 of FIG. 1) may provide a user with information on a benefit place that offers a benefit to an affiliation-authenticated user account.

The user terminal (e.g., the user terminal 110 in FIG. 1 and the user terminal 210 in FIG. 2) may display a graphic representation for search of the benefit place that offers a benefit to the affiliation-authenticated user account based on at least one of search information of the user or location information of the user.

According to an embodiment, a server (e.g., the server 120 of FIG. 1 and the server 220 of FIG. 2) may transmit, to the user terminal, a display command of the graphic representation for the search of the benefit place that offers a benefit to the affiliation-authenticated user account based on at least one of the search information of the user or the location information of the user. In response to receiving the display command of the graphic representation for the search of the benefit place from the server, the user terminal may display the graphic representation for the search of the benefit place.

For example, the graphic representation for the search of the benefit place may be displayed based on the search information of the user. For example, in a screen 610, in response a number of places related to affiliation authentication included in a focused target area exceeding a threshold number, the user terminal may display a graphic representation 611 for the search of the benefit place. As shown in the screen 610, the graphic representation 611 for the search of the benefit place may be displayed in a form of a short cut. For example, in a screen 620, when a search term (e.g., X university yummy restaurant) entered in a map application includes a keyword corresponding to affiliation authentication (e.g., X university), the user terminal may display a graphic representation 621 for the search of the benefit place. As shown in the screen 620, the graphic representation 621 for the search of the benefit place may be displayed in a form of a suggested search term. For example, in a screen 630, in response to a searched place (e.g., Seoul campus of X university) corresponding to a place related to affiliation authentication, the user terminal may display a graphic representation 631 for the search of the benefit place.

For example, the graphic representation for the search of the benefit place may be displayed based on the location information of the user. For example, in response to a location of the user being included in an area corresponding to affiliation authentication, the user terminal may display the graphic representation for the search of the benefit place.

The user terminal may display a list of benefit places in response to detecting a user input for the graphic representation for the search of the benefit place.

According to an embodiment, in response to detecting a user input (e.g., a user input 612, a user input 622, and a user input 632) for the graphic representation (e.g., the graphic representation 611, the graphic representation 621, and the graphic representation 631) for the search of the benefit place, the server may transmit a display command of the list of benefit places to the user terminal. The user terminal may display the list of benefit places in response to receiving the display command of the list of benefit places from the server.

The user terminal may display the list of benefit places in a screen 640 based on the user input (e.g., the user input 612, the user input 622, and the user input 632) for the graphic representation (e.g., the graphic representation 611, the graphic representation 621, and the graphic representation 631) for the search of the benefit place being detected. For example, when the user input (e.g., the user input 612, the user input 622, and the user input 632) for the graphic representation (e.g., the graphic representation 611, the graphic representation 621, and the graphic representation 631) for the search of the benefit place is detected, the user terminal may provide a search result corresponding to a keyword (e.g., student authentication benefit) related to a benefit in the map application. The search result corresponding to the keyword related to a benefit may include a benefit place that offers the benefit by applying a synonym query between the keyword related to the benefit and a name of the benefit place. For example, the name (e.g., A restaurant, B amusement park) of a benefit place may be treated as a word having a same meaning as the keyword (e.g., student authentication benefit) related to the benefit. As a result, the search result corresponding to the keyword related to a benefit may include a benefit place ranked higher (e.g., with a higher score) than other places that do not offer a benefit.

According to an embodiment, the user terminal may determine an affiliation of the user based on the search information of the user or the location information of the user and may display a list of benefit places included in an area corresponding to the determined affiliation and a list of benefit places included in other areas. Here, the user terminal may display information on the benefit places included in the area corresponding to the determined affiliation (e.g., X university) optimally (e.g., with a higher rank) and may display information on the benefit places included in other areas suboptimally (e.g., with a lower rank).

The user terminal displaying the graphic representation and/or the list of benefit places in response to receiving the display command (e.g., the display command of the graphic representation for the search of the benefit place and the display command of the list of benefit places) from the server is mainly described herein, but embodiments are not limited thereto. According to an embodiment, the user terminal may determine whether to display the graphic representation for the search of the benefit place and/or whether to display the list of benefit places based on the search information of the user or the location information of the user.

Figure 7:
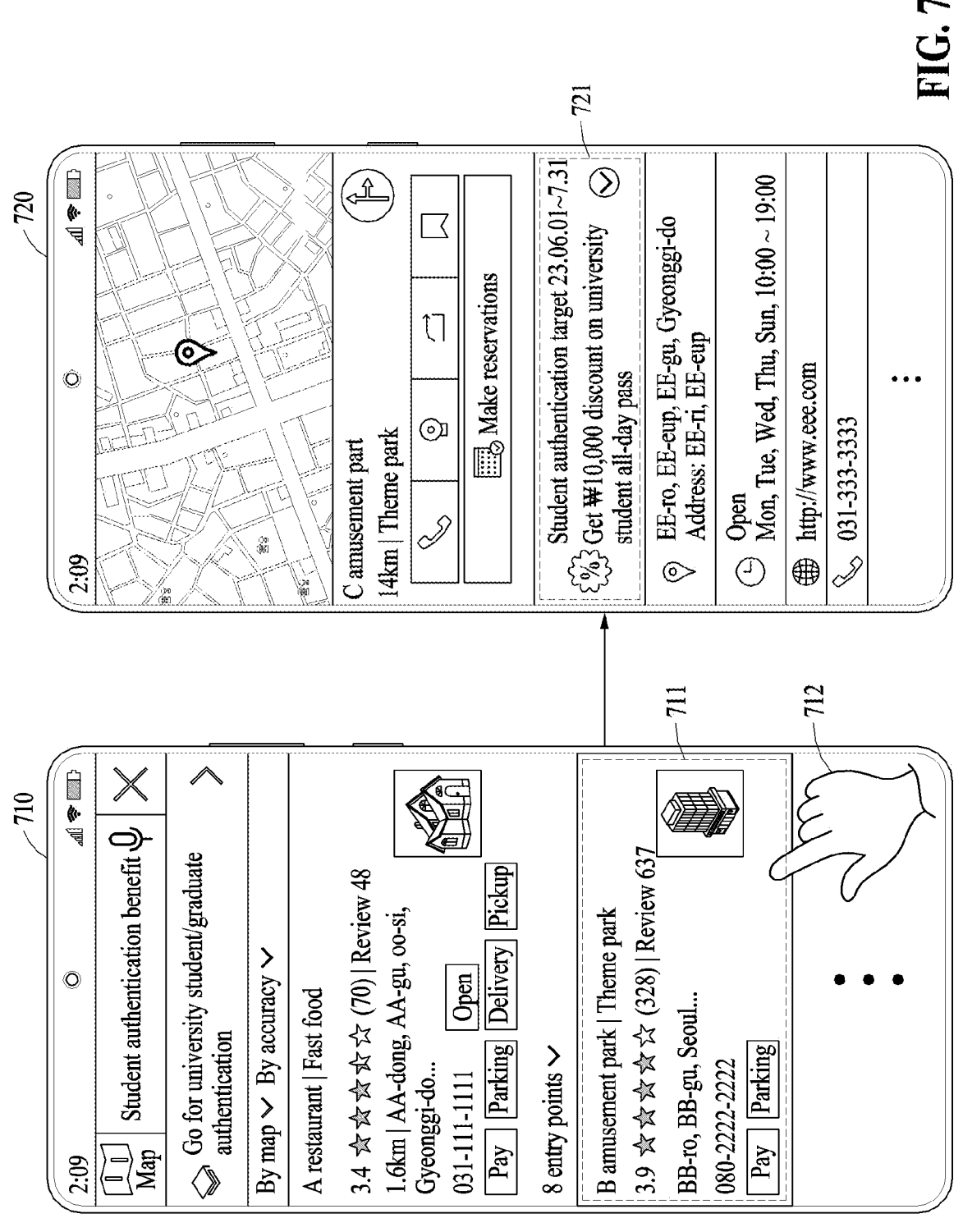
FIG. 7 is a diagram illustrating an example of a screen for displaying information on a benefit place, according to an embodiment.

FIG. 7 is a diagram illustrating an example of a screen for displaying information on a benefit place, according to an embodiment.

According to an embodiment, an affiliation authentication system (e.g., the affiliation authentication system 100 of FIG. 1) may provide a user with information on a benefit place that offers a benefit to an affiliation-authenticated user account.

In response to entering a keyword related to a benefit offered to the affiliation-authenticated user account, a user terminal may display a list of benefit places related to the keyword. The list of benefit places may include a benefit place (or information on the benefit place) that offers a benefit to the affiliation-authenticated user account. The list of benefit places related to the keyword may include a benefit place (or information on the benefit place), which is included in the benefit places and related to the entered keyword.

According to an embodiment, in response to entering a keyword related to a benefit offered to the affiliation-authenticated user account, a server may transmit a display command of a list of benefit places related to the keyword to the user terminal.

The keyword related to a benefit may include, for example, at least one of 'affiliation authentication,' 'affiliation authentication benefit,' 'place for affiliation authentication use,' 'school authentication,' 'school authentication benefit,' 'place for school authentication use,' 'company authentication,' 'company authentication benefit,' or 'place for company authentication use.' However, the present disclosure is not limited to the keyword related to a benefit described above, and the keyword related to a benefit may be defined by a service provider. For example, the keyword related to a benefit may include a predetermined keyword.

For example, when a keyword (e.g., school authentication, place for school authentication use, and school authentication benefit) related to one authentication type (e.g., school authentication) among a plurality of authentication types is entered, the user terminal may display a list of benefit places including a place (e.g., a benefit place that offers a benefit to a school-authenticated user account) related to the keyword related to the authentication type.

For example, in response to entering a search term including a keyword related to a benefit, a synonym query may be applied between the keyword related to the benefit and a name of a benefit place that offers the benefit so that a search result may include a list of benefit places.

In response to obtaining an inquiry request requesting an inquiry about a target place corresponding to a benefit place that offers a benefit to an affiliation-authenticated user account, the user terminal may display a graphic representation indicating offering of the benefit.

According to an embodiment, in response to receiving from the user terminal an inquiry request requesting an inquiry about a target place and in response to the target place corresponding to a benefit place that offers a benefit to an affiliation-authenticated user account, the server may transmit, to the user terminal, a display command of a graphic representation indicating offering of the benefit. The user terminal may display the graphic representation indicating offering of the benefit in response to receiving the display command of the graphic representation indicating offering of the benefit from the server. For example, the user terminal may further display the graphic representation indicating offering of the benefit along with basic information on the target place.

The basic information on the target place may include information that is independent of (e.g., irrelevant to) the affiliation authentication and may include, for example, at least one of a name, address, phone number, and business hours of the target place, or a product (or a service) provided by the target place.

For example, in a screen 710, the user terminal may display a list of benefit places in response to entering a search term including a keyword (e.g., 'student authentication benefit') related to a benefit. The user terminal may obtain an inquiry request for the target place based on detecting a user input 712 for an area 711 corresponding to the target place (e.g., C amusement park) among a plurality of benefit places (e.g., A restaurant, B amusement park, C amusement park, and D restaurant) included in the list of benefit places. In response to obtaining an inquiry request for the target place, the user terminal may display a screen 720 for an inquiry about information on the target place. In the screen 720, the user terminal may display a graphic representation 721 indicating offering of the benefit in response to the target place corresponding to the benefit place that offers a benefit to the affiliation-authenticated user account.

The user terminal displaying the graphic representation and/or the list of benefit places in response to receiving the display command (e.g., the display command of the list of benefit places and a display command of the graphic representation indicating offering of a benefit) from the server is mainly described herein, but embodiments are not limited thereto. According to an embodiment, the user terminal may determine whether to display the graphic representation indicating offering of the benefit and/or whether to display the list of benefit places based on search information or location information of the user.

Figure 8:
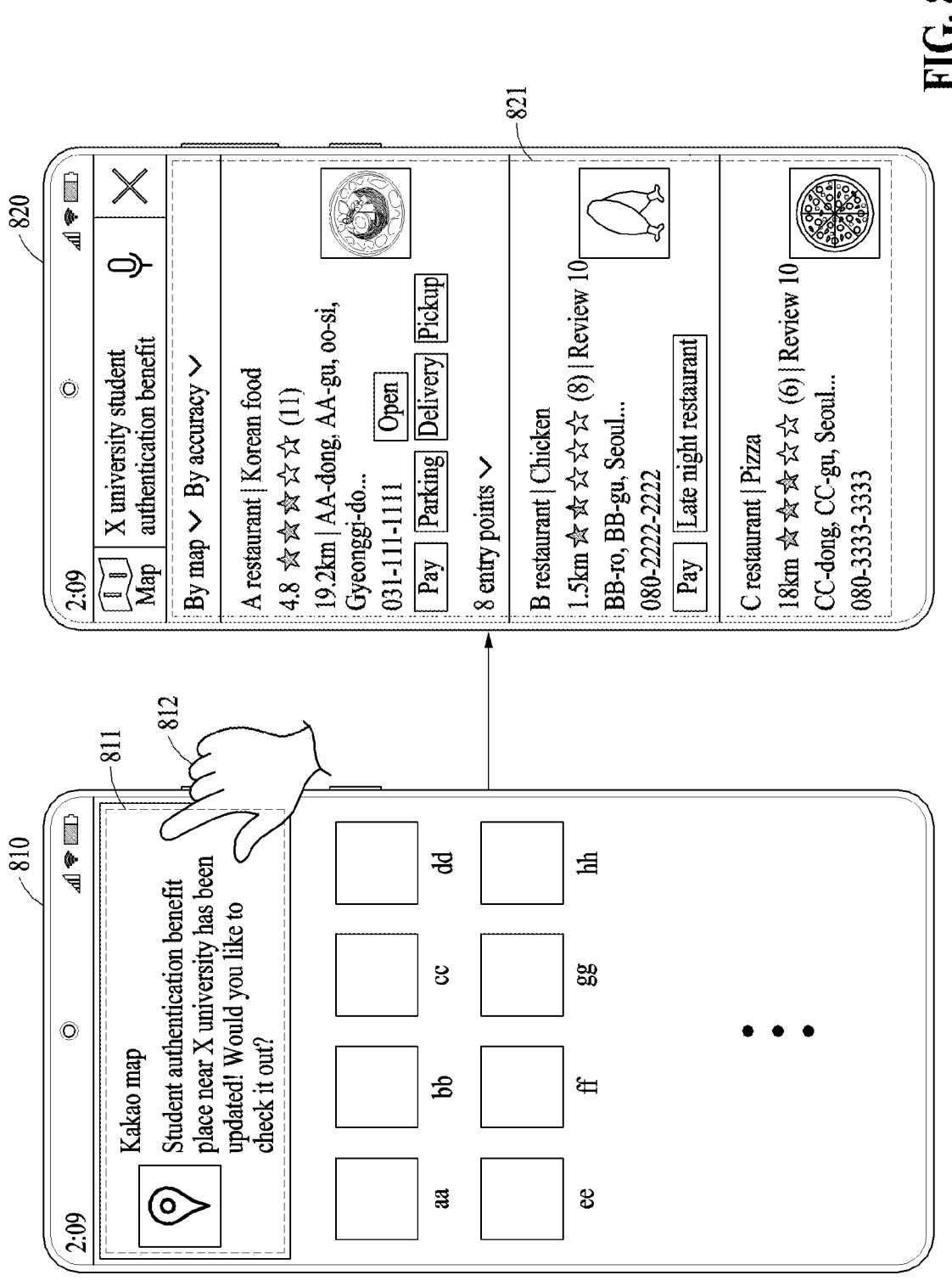
FIG. 8 is a diagram illustrating an example of a screen for displaying a guidance message including change information on a benefit location, according to an embodiment.

FIG. 8 is a diagram illustrating an example of a screen for displaying a guidance message including change information on a benefit place, according to an embodiment.

According to an embodiment, an affiliation authentication system (e.g., the affiliation authentication system 100 of FIG. 1) may provide a user with a guidance message including change information on a benefit place that offers a benefit to an affiliation-authenticated user account.

In response to a user account being affiliation-authenticated, a user terminal may display a guidance message informing of a change in a benefit place based on the change in the benefit place included in an area corresponding to an affiliation of the user account. The area corresponding to the affiliation of the user account may include an area (e.g., a university area of school A and an area around a shuttle bus stop of company B) corresponding to the affiliation (e.g., school A and company B) of an authenticated user. For example, when the affiliation of the user account is school-authenticated as school A, the user terminal may restrict displaying a guidance message informing of a change in a benefit place included in an area (e.g., a university area of school B) corresponding to school B.

The change in a benefit place may include at least one of addition of a benefit place, deletion of a benefit place (e.g., discontinuity of a benefit offer at a benefit place), or a change in a benefit offered at a benefit place (e.g., a change in a benefit from a discount on product A to a discount on product B).

According to an embodiment, in response to the user account being affiliation-authenticated, the server may transmit, to the user terminal, a display command of a guidance message including change information on a benefit place included in an area corresponding to the affiliation of the user account based on a change in the benefit place. In response to receiving the display command of the guidance message from the server, the user terminal may display the guidance message including the change information on the benefit place.

In response to detecting a user input for the guidance message including the change information on the benefit place, the user terminal may display a list of benefit places including a benefit place included in an area corresponding to the affiliation of the user account. For example, the user terminal may display a list of benefit places included in the area corresponding to the affiliation and a list of benefit places included in other areas. Here, the user terminal may display information on a benefit place included in the area corresponding to the affiliation optimally (e.g., with a higher rank) and may display information on benefit places included in other areas suboptimally (e.g., with a lower rank).

For example, as shown in FIG. 8, in a screen 810, the user terminal may display a guidance message 811 informing of a change in a benefit place based on a change in the benefit place included in the area corresponding to the affiliation of the user account. In response to detecting a user input 812 for the guidance message 811 including change information on a benefit place, the user terminal may display a screen 820 including a list 821 of benefit places including benefit places included in the area corresponding to the affiliation of the user account.

Figure 9:
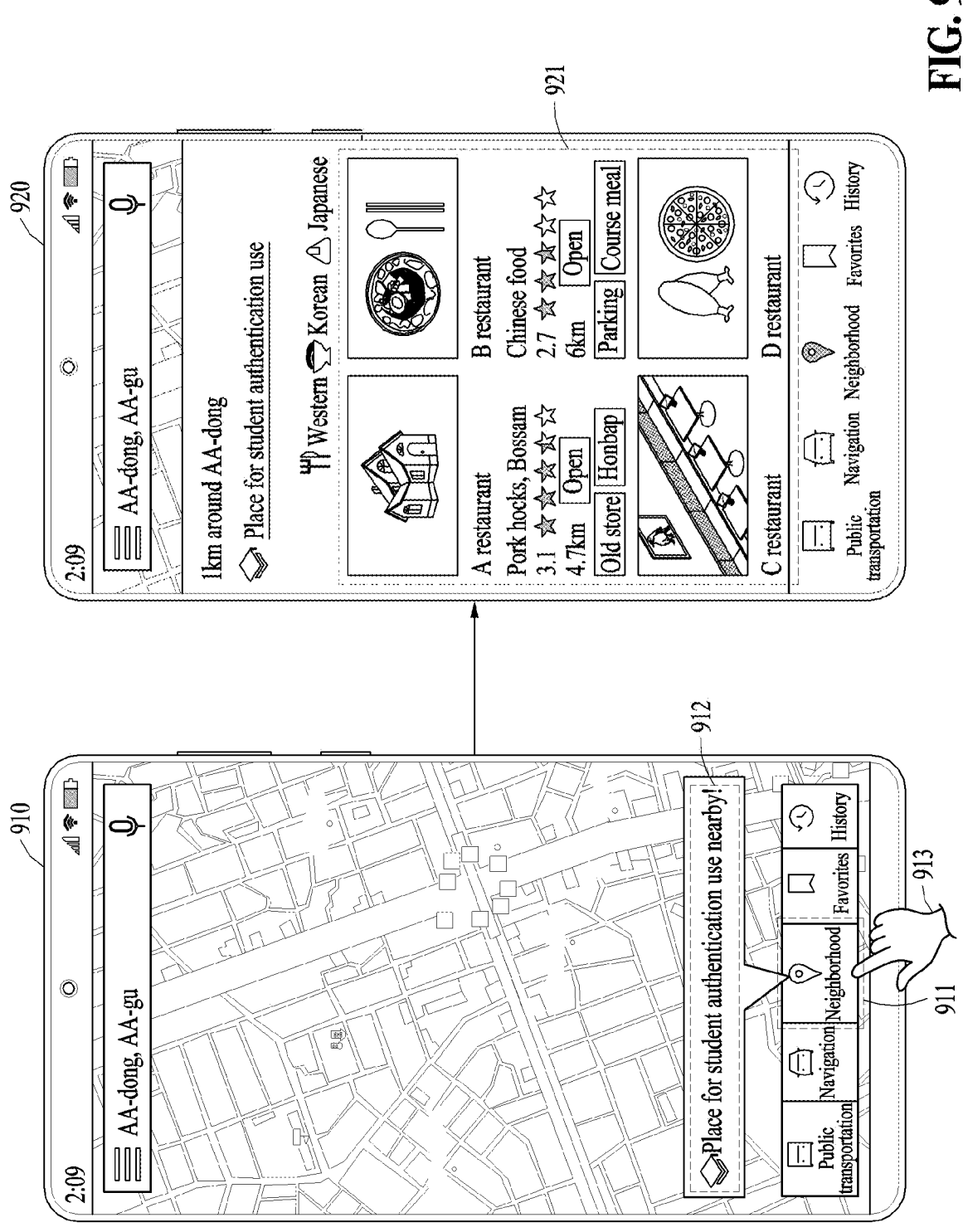
FIG. 9 is a diagram illustrating an example of a screen for displaying information on a benefit location, according to an embodiment.

FIG. 9 is a diagram illustrating an example of a screen for displaying information on a benefit place, according to an embodiment.

According to an embodiment, an affiliation authentication system (e.g., the affiliation authentication system 100 of FIG. 1) may provide a user with information on a benefit place that offers a benefit to an affiliation-authenticated user account.

In a screen 910, based on a focused target area, a user terminal may display a graphic representation 911 for a list of places included in the focused target area. The user terminal may further display a graphic representation 912 indicating a presence of the benefit place based on the focused target area. For example, in response to a number of places related to affiliation authentication included in the focused target area exceeding a threshold number, the user terminal may further display the graphic representation 912 indicating the presence of the benefit place.

In response to detecting a user input 913 for the graphic representation 911 for the list of places included in the focused target area, the user terminal may display the list of places included in the focused target area. The user terminal may display a screen 920 including a list 921 of benefit places that includes a benefit place among the places included in the focused target area.

The examples described herein may be implemented using hardware components, software components, and/or combinations thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be permanently or temporarily embodied in any type of machine, component, physical or virtual equipment, or computer storage medium or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), RAM, flash memory, and the like. Examples of program instructions include both machine code, such as those produced by a compiler, and files containing higher-level code that may be executed by the computer using an interpreter.

The above-described hardware devices may be configured to act as one or more software modules in order to perform the operations of the above-described examples, or vice versa.

As used herein, each of "A or B," "at least one of A and B," "at least one of A or B," "A, B, or C," "at least one of A, B, and C," "at least one of A, B, or C," "one or a combination or two or more of A, B, and C," and the like may include any one of the items listed together in the corresponding one of the phrases, or all possible combinations thereof.

Although the examples have been described with reference to the limited number of drawings, it will be apparent to one of ordinary skill in the art that various technical modifications and variations may be made in the examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other examples, and equivalents to the claims are also within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for efficient memory management of a software application performed by a server, the method comprising:

collecting, from a user terminal executing a map application, search information of the user comprising at least one of a search term searched within the map application, a searched place searched within the map application, or a target area displayed on display of the user terminal as focused area on a map provided through the map application;

analyzing the search information to determine whether the search information corresponds to an affiliation entity including at least one of a school, university, company, or organization that provides an authentication system for verifying user credentials;

determining, based on the analysis, whether to display a graphic representation requesting affiliation authentication;

in response to determining to display the graphic representation, transmitting, to the user terminal, a display command of the graphic representation requesting affiliation authentication;

transmitting an offer command of a process for the affiliation authentication of a user account to the user terminal in response to a user input for the graphic representation requesting the affiliation authentication; and authenticating the user and obtaining corresponding affiliation from a memory of the server, wherein the user account is associated with a plurality of affiliation types, and authentication requests are initiated for each affiliation type independently based on corresponding search information.

2. The method of claim 1, wherein the search information of the user comprises:

at least one of a search term entered by the user, a searched place, or a focused target area in the map application.

3. The method of claim 1, wherein the transmitting of the display command of the graphic representation requesting the affiliation authentication comprises:

determining a reference location of the user based on the search information of the user; and transmitting the display command of the graphic representation requesting the affiliation authentication to the user terminal in response to the determined reference location of the user being included in an area corresponding to the affiliation authentication.

4. The method of claim 1, wherein the transmitting of the display command of the graphic representation requesting the affiliation authentication comprises:

transmitting, to the user terminal, a display command of a graphic representation requesting the affiliation authentication comprising at least one of student authentication, completion authentication, graduate authentication, or faculty authentication of a school.

5. The method of claim 1, further comprising:

transmitting, to the user terminal, a display command of a graphic representation for search of a benefit place that offers a benefit to an affiliation-authenticated user account, based on the search information of the user; and transmitting a display command of a list of benefit places to the user terminal in response to detecting a user input for the graphic representation for the search of the benefit place.

6. The method of claim 1, further comprising:

in response to entering a keyword related to a benefit offered to an affiliation-authenticated user account, transmitting a display command of a list of benefit places related to the keyword to the user terminal.

7. The method of claim 1, further comprising:

in response to receiving from the user terminal an inquiry request requesting an inquiry about a target place and in response to the target place corresponding to a benefit place that offers a benefit to an affiliation-authenticated user account, transmitting, to the user terminal, a display command of a graphic representation indicating offering of the benefit.

8. The method of claim 1, further comprising:

in response to the user account being affiliation-authenticated, transmitting, to the user terminal, a display command of a guidance message comprising change information on a benefit place included in an area corresponding to an affiliation of the user account based on a change in the benefit place.

9. The method of claim 1, wherein the transmitting of the display command of the graphic representation requesting the affiliation authentication comprises:

in response to the user account being affiliation-authenticated, restricting transmission of the display command of the graphic representation requesting the affiliation authentication to the user terminal.

10. The method of claim 1, wherein the transmitting of the display command of the graphic representation requesting the affiliation authentication comprises:

determining an authentication type based on the search information of the user; and transmitting a display command of a graphic representation requesting the affiliation authentication of the determined authentication type to the user terminal.

11. The method of claim 1, wherein the transmitting of the display command of the graphic representation requesting the affiliation authentication comprises:

determining an affiliation of the user based on the search information of the user; and transmitting a display command of a graphic representation requesting the affiliation authentication of the determined affiliation to the user terminal.

12. A non-transitory computer-readable storage medium storing instructions that, when executed by a processor, cause the processor to perform the method of claim 1.

13. The method of claim 1, wherein, after the user account has been authenticated for a first affiliation type, authentication requests for the first affiliation type are not repeated during subsequent user interactions with the map application.

14. The method of claim 1, wherein the search information includes location information.

15. A method performed by a user terminal communicating with a server for efficient memory management of a software application, the method comprising:

receiving, from the server, a display command of a graphic representation requesting affiliation authentication, the display command being generated based on an analysis by the server of search information of a user comprising at least one of a search term searched within a map application, a searched place, or a target area displayed on a display of the user terminal as a focused area on a map provided through the map application, the analysis determining whether the search information corresponds to an affiliation entity representing an organization with which the user may have a verifiable relationship, the organization including at least one of a school, university, company, or other group that performs the affiliation authentication of its members or users;

displaying, on the user terminal, the graphic representation requesting affiliation authentication based on the received display command;

providing, by the server, in response to detecting a user input for the graphic representation requesting the affiliation authentication, a process for the affiliation authentication of a user account to the user; and requesting authentication of the user and obtaining corresponding affiliation from a memory of the server, wherein the user account is associated with a plurality of affiliation types, and authentication requests are initiated for each affiliation type independently based on corresponding search information.

16. The method of claim 15, wherein the search information of the user comprises:

at least one of a search term entered by the user, a searched place, or a focused target area in the map application.

17. The method of claim 15, wherein the displaying of the graphic representation requesting the affiliation authentication comprises:

displaying the graphic representation requesting the affiliation authentication in response to a reference location of the user being included in an area corresponding to the affiliation authentication, wherein the reference location is determined based on the search information of the user.

18. The method of claim 15, wherein the displaying of the graphic representation requesting the affiliation authentication comprises:

displaying the graphic representation for affiliation authentication including at least one of student authentication, completion authentication, graduate authentication, or faculty certification.

19. The method of claim 15, further comprising:

displaying a graphic representation for search of a benefit place that offers a benefit to an affiliation-authenticated user account, based on the search information of the user; and displaying a list of benefit places in response to detecting a user input for the graphic representation for the search of the benefit place.

20. The method of claim 19, further comprising transmitting a display command of a list of benefit places associated with the authenticated affiliation type, wherein the list is displayed only in response to successful authentication for the corresponding affiliation type.

21. The method of claim 15, further comprising:

in response to entering a keyword related to a benefit offered to an affiliation-authenticated user account, displaying a list of benefit places related to the keyword.

22. The method of claim 15, further comprising:

in response to the user account being affiliation-authenticated, displaying a guidance message informing of a change in a benefit place included in an area corresponding to an affiliation of the user account based on a change in the benefit place.

23. A server for efficient memory management of a software application, comprising:

a communicator;

a memory configured to store computer-executable instructions; and a processor configured to execute the instructions by accessing the memory, wherein the instructions, when executed by the processor, cause the server to:

collect, from a user terminal executing a map application, search information of a user comprising at least one of a search term searched within the map application, a searched place, or a target area displayed on a display of the user terminal as a focused area on a map provided through the map application;

analyze the search information to determine whether the search information corresponds to an affiliation entity representing an organization with which the user may have a verifiable relationship, the organization including at least one of a school, university, company, or other group that performs affiliation authentication of its members or users;

determine, based on the analysis, whether to display a graphic representation requesting the affiliation authentication;

in response to determining to display the graphic representation, transmit, to the user terminal, a display command of the graphic representation requesting affiliation authentication; and transmit an offer command of a process for the affiliation authentication of a user account to the user terminal in response to a user input for a graphic representation requesting the affiliation authentication, authenticate the user and obtain corresponding affiliation from the memory of the server, wherein the user account is associated with a plurality of affiliation types, and authentication requests are initiated for each affiliation type independently based on corresponding search information.

\* \* \* \* \*